United States Patent
Rossi

(10) Patent No.: US 7,415,585 B1
(45) Date of Patent: Aug. 19, 2008

(54) SPACE-OPTIMIZED BACKUP REPOSITORY GROOMING

(75) Inventor: Robert P. Rossi, Altamonte Springs, FL (US)

(73) Assignee: Symantec Operating Corporation, Cupertino, CA (US)

( * ) Notice: Subject to any disclaimer, the term of this patent is extended or adjusted under 35 U.S.C. 154(b) by 307 days.

(21) Appl. No.: 10/992,273

(22) Filed: Nov. 18, 2004

(51) Int. Cl.
*G06F 12/00* (2006.01)

(52) U.S. Cl. ................ 711/162; 711/161
(58) Field of Classification Search ........... None
See application file for complete search history.

(56) References Cited

U.S. PATENT DOCUMENTS

| | | | |
|---|---|---|---|
| 6,101,585 A | 8/2000 | Brown et al. | |
| 6,526,434 B1 | 2/2003 | Carlson et al. | |
| 6,665,815 B1 | 12/2003 | Goldstein et al. | |
| 6,701,450 B1 | 3/2004 | Gold et al. | |
| 6,829,688 B2 | 12/2004 | Grubbs et al. | |
| 6,847,983 B2 | 1/2005 | Somalwar et al. | |
| 6,880,051 B2 | 4/2005 | Timpanaro-Perrotta | |
| 2003/0145248 A1 | 7/2003 | McNeil | |
| 2003/0163493 A1 | 8/2003 | Burns | |
| 2003/0177149 A1 | 9/2003 | Coombs | |
| 2004/0030852 A1 | 2/2004 | Coombs | |
| 2004/0268068 A1 | 12/2004 | Curran et al. | |
| 2005/0091461 A1* | 4/2005 | Kisley et al. | 711/162 |
| 2007/0156984 A1* | 7/2007 | Ebata | 711/162 |

* cited by examiner

*Primary Examiner*—Reginald G. Bragdon
*Assistant Examiner*—Shawn X Gu
(74) *Attorney, Agent, or Firm*—Meyertons Hood Kivlin Kowert & Goetzel, P.C.; B. Noël Kivlin

(57) ABSTRACT

A system for space optimized backup repository grooming includes a backup converter and a primary backup repository comprising a first backup sequence including two or more backup images of a data source. Each backup image may be of a particular backup image type, such as a full image, a differential image, or an incremental image. Upon an occurrence of a triggering event, the backup converter may be configured to convert the first sequence of backup images into a second sequence of backup images by converting a particular backup image of the first sequence into a transformed backup image of a different backup type. The triggering event may, for example, be an expiration of an interval specified in a schedule, a reception of an administrative command, or a detection that a condition specified in a backup sequence conversion policy has been met.

16 Claims, 10 Drawing Sheets

SPACE-OPTIMIZED BACKUP REPOSITORY GROOMING

BACKGROUND OF THE INVENTION

1. Field of the Invention

This invention relates to computer systems and, more particularly, to backup management within computer systems.

2. Description of the Related Art

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Any one of a variety of failures, such as system crashes, hardware storage device failures, and software defects, may potentially lead to a corruption or a loss of critical data in such environments. In order to recover from such failures, various kinds of backup techniques may be employed. Traditionally, for example, backup images of critical data may have been created periodically (e.g., once a day) and stored on tape devices. As prices for random access media such as disk devices have continued to fall, some information technology (IT) organizations have begun to use random access media for storing backup images as well. In some storage environments, multiple layers of storage may be dedicated to storing backup images: e.g., backup images may be stored on disk or on a particular type of tape device initially, and staged periodically to a second type of tape device or other secondary media for long-term storage.

Backup solution vendors may allow users to create several different types of backup images for a given data source (e.g., one or more file systems), such as full images, differential images, and incremental images. A full image may include a complete copy of the data source, e.g., a copy of all the files within one or more file system, and so may be used to restore the state of the data source as of the time the full image was created, without a need to access any other backup image. Differential and incremental images may include changes that may have occurred at the data source over a period of time, rather than the full contents of the data source, and may therefore typically require less storage than full images. Differential images and incremental images may typically be created and managed as part of a sequence of backup images, where the sequence includes at least one full image, and may be used in combination with a previously created full image within the sequence to restore the state of the data source. Such a sequence of backup images for a data source may also be referred to as a backup set. Differential and incremental images may differ from each other in the number of backup images that may need to be analyzed or processed during restoration of the state of the data source.

For example, in one environment, a full image ("F-Sun") of a data source may be created every Sunday, and a differential image (e.g., "D-Mon", "D-Tue", "D-Wed", etc.) may be created every other day of the week. In such an example, a differential backup image "D-Wed" created on a Wednesday may include sufficient information that, when combined with the information stored in the previous full image "F-Sun", allows the state of the data source as of Wednesday to be restored. Thus, a differential image may contain information on all the changes affecting backup that may have occurred at the data source since a previous full image was created.

In a second example, a full image ("F-Sun") of a data source may also be created every Sunday, but incremental images (e.g., "I-Mon", "I-Tue", "I-Wed") may be created every other day of the week. In this second example, information contained within "I-Wed" may have to be combined not only with information contained within "F-Sun", but also with information contained within all intermediate incremental images (i.e., "I-Mon" and "I-Tue"), in order to restore the state of the data source as of Wednesday. That is, an incremental image may only contain information on the changes affecting backup that may have occurred at the data source since an immediately previous image of any kind was created. The immediately previous image may be another incremental image, a differential image, or a full image. Restoration using a given incremental image may therefore typically require processing more backup images than restoration using a differential image, especially as the number of intermediate incremental images between the last full image and the given incremental image increases.

Both incremental images and differential images may usually require less storage space than full images, and an incremental image may often require less storage space than a differential image created at about the same time for the same data source. For large data sources, such as file systems or volumes that collectively occupy terabytes of storage space, the difference in storage space requirements for the different backup image types may be substantial. A technique or method that reduces the amount of storage space needed to store backup sequences while retaining the ability to restore data source state as of desired points in time may therefore be desirable.

SUMMARY OF THE INVENTION

Various embodiments of a system and method for space-optimized backup repository grooming are disclosed. According to a first embodiment, the system may include a backup converter and a primary backup repository comprising a first backup sequence including two or more backup images of a data source. Each backup image may be of a particular backup image type, such as a full image, a differential image, or an incremental image. Upon an occurrence of a triggering event, the backup converter may be configured to convert the first sequence of backup images into a second sequence of backup images by converting a particular backup image of the first sequence into a transformed backup image of a different backup type. The triggering event may, for example, be an expiration of an interval specified in a schedule, a reception of an administrative command, or a detection that a condition specified in a backup sequence conversion policy has been met.

A variety of different conditions may be specified in the backup sequence conversion policy in different embodiments. Some policies may be associated with resource consumption levels; for example, a triggering event may be a detection that the storage used for a particular type of backup image has reached a specified level. Backup sequence conversion may also be triggered by a detection that the utilization of a specified resource or set of resources (such as a group of disks or tapes) has reached a specified level, or has remained within a specified range for a specified time.

The transformed backup image may typically require less storage space than the particular backup image from which it may be derived. For example, a full image may be converted into either a differential image or an incremental image, and a differential image may be converted into an incremental image.

Several other embodiments are also disclosed. According to another embodiment, a system may include a backup converter and a primary backup repository comprising a first sequence of backup images including a first and a second incremental image of a data source. Upon the occurrence of a triggering event, the backup converter may be configured to logically combine the first and second incremental images into a single image. The single image may be another incremental image or a differential image. The logically combined single image may contain enough information to restore the state of the data source as of the time that the second incremental image was created.

According to another embodiment, a system may include a backup converter, a primary backup repository comprising a first backup sequence including two or more backup images of a data source, and a space optimization client. Upon the occurrence of a triggering event, the space optimization client may be configured to send a space optimization request to the backup converter. In response to the space optimization request, the backup converter may be configured to convert the first sequence of backup images into a second sequence of backup images by converting a particular backup image of the first sequence into a transformed backup image of a different backup type.

In one additional embodiment, a system may include a backup converter, a primary backup repository comprising a first backup sequence including a first and a second incremental image of a data source, and a space optimization client. Upon the occurrence of a triggering event, the space optimization client may be configured to send a space optimization request to the backup converter. In response to the space optimization request, the backup converter may be configured to logically combine the first and second incremental images into a single backup image.

Figure 1:
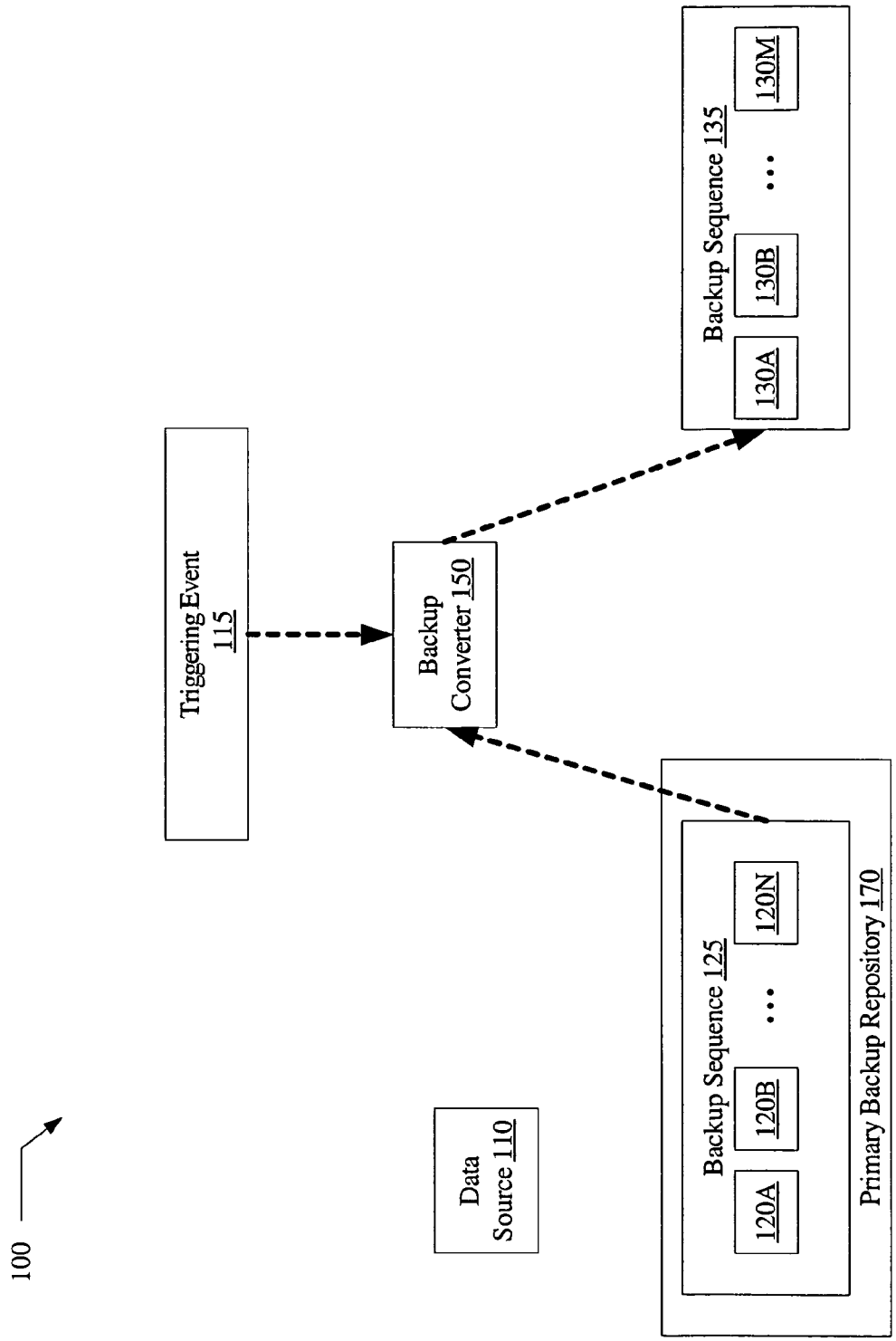
FIG. 1 is a block diagram of a system according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram of a system 100 according to one embodiment. The system includes a first backup image sequence 125 stored in a primary backup repository 170 and a backup converter 150. The first backup image sequence 125 may include a plurality of backup images 120A, 120B, . . . 120N (which may be collectively referred to herein as backup images 120) of a data source 110. Upon an occurrence of a triggering event 115, backup converter 170 may be configured to convert the first backup image sequence 125 into a second backup image sequence 135 including a plurality of backup images 130A, 130B, . . . 130M (collectively, backup images 130). Triggering event 115 may be any of a variety of different types of events, such as an expiration of a scheduled interval, a detection of a condition specified in a backup conversion policy, a command issued by an administrator, etc. Further details and examples of different types of triggering events are provided below.

Backup images 120 may include full, differential and incremental images. During the conversion of backup image sequence 125, backup converter 150 may be configured to reduce the amount of storage space required to store backup images using any combination of a variety of conversion techniques. For example, backup converter 150 may convert a particular backup image 120 (such as a full image) to a transformed backup image 130 of a different backup type (such as an incremental image) that may require less space, logically combine two or more backup images 120 into a single backup image 130, and/or exclude a specified subset of backup images 120 from transformed backup sequence 135. Further details and examples of specific transformations and logical combinations that may be performed by backup converter 150 are provided in conjunction with FIGS. 5a-5c and FIGS. 6a-6b below. As also described below, transformed backup sequence 135 may be stored either within primary backup repository 170, at a secondary backup repository, or at a combination of primary backup repository 170 and a secondary backup repository. In the subsequent description, the phrases "backup sequence" and "backup set" may each be considered synonymous to the phrase "backup image sequence". The backup sequence transformation operations performed by backup converter 150 to reduce storage requirements in response to an occurrence of a triggering event may be referred to as "backup set grooming" or "backup repository grooming".

Individual backup images 120 of backup sequence 125 may represent the state of a data source at different points in time. For example, backup image 120A may be created at a certain time T1, backup image 120B at a later time T2, and so on. Any of a variety of backup solutions from different vendors, such as the VERITAS NetBackup™ Server product from VERITAS Software Corporation, may be used to create backup sequence 125. Such backup solutions may, for example, allow users to specify various parameters related to the data source, the times at which backup images 120 are created (i.e., a backup schedule), the backup types of individual backup images 120, as well as the locations or devices where the backup images 120 are to stored.

Parameters related to the data source may include names of backup client hosts, as well as the specific directories, folders, files, volumes, file systems, or other virtual storage devices on the backup client hosts that make up the set of data for which backup images are to be created. In some cases, it may be possible to list not only the storage objects (e.g., files) that are to be included within the backup image, but also to list specific storage objects (such as directories for temporary files) that are to be excluded from the backup images. Storage objects from multiple client hosts may be included within a single backup image in some embodiments.

A backup schedule may allow a user to specify when backups of different types are to occur. For example, according to one schedule, a full backup image of the data source (i.e., a copy of all data objects within the data source that are not explicitly excluded from the backup) may be created every week during a specified time interval (e.g., between 1 AM and 7 AM on Mondays). According to a second schedule, a differential backup image (i.e., an image incorporating data source changes that may have occurred since the last full image was created) may be created once a day. According to a third schedule, an incremental backup image (i.e., an image incorporating data source changes that may have occurred since the last backup image of any type was created) may be created after every work shift (e.g., after every eight hours). Some backup solutions may allow multiple schedules to be operational in parallel, or allow the inclusion of different backup types within a single schedule. Users of the backup solutions may also specify storage devices (e.g., disk drives or tape drives) or locations (e.g., directories) where the created backup images may be stored, as well as various other parameters related to backup image creation (e.g., whether a set of trusted users is allowed to initiate backup image creation during specified time intervals, steps to be taken when exceptional conditions or errors occur, etc.).

Various factors may be considered in selecting the types and frequencies of backups to be performed during a backup schedule. Full backups may take up the most storage space, for example, but may also support a simple restoration process. Restoration to a point in time when a full backup F1 was created may require the use of no backup image other than F1 itself. In contrast, if a backup sequence or backup set consists of a full image F1 created at a time T1, followed by a sequence of consecutive incremental image I1, I2, and I3 (created at respective times T2, T3, and T4), and a restoration of the data source as T4 is desired, the backup solution may need to access each of the backup images in sequence and perform restoration for each successive backup image. First the state of the data source as of time T1 may be restored using F1, then changes between T1 and T2 may be applied using I1, and so on. Thus there may be a tradeoff between storage space usage and the resources required for restoration. Differential images may lie between full images and incremental images, both in storage space requirements and in resources required for restoration.

As the number of backup images 120 within backup sequence 125 increases, the total storage space required for backup sequence 125 may increase as well. The rate of increase in storage requirements may depend on a variety of factors, such as the types of backups in the sequence and the frequency of updates to the data source. For large data sources (e.g., data sources including hundreds of gigabytes or multiple terabytes of data), especially data sources supporting update-intensive applications such as on-line transaction processing (OLTP) systems, the total amount of storage required for backup sequence 125 within primary backup repository 170 may rapidly approach unmanageable levels. Upon the occurrence of a triggering event 115, any of a number of different techniques may be used by backup converter to transform backup sequence 125 into a second backup sequence 135 that requires less storage, as described below.

Figure 2:
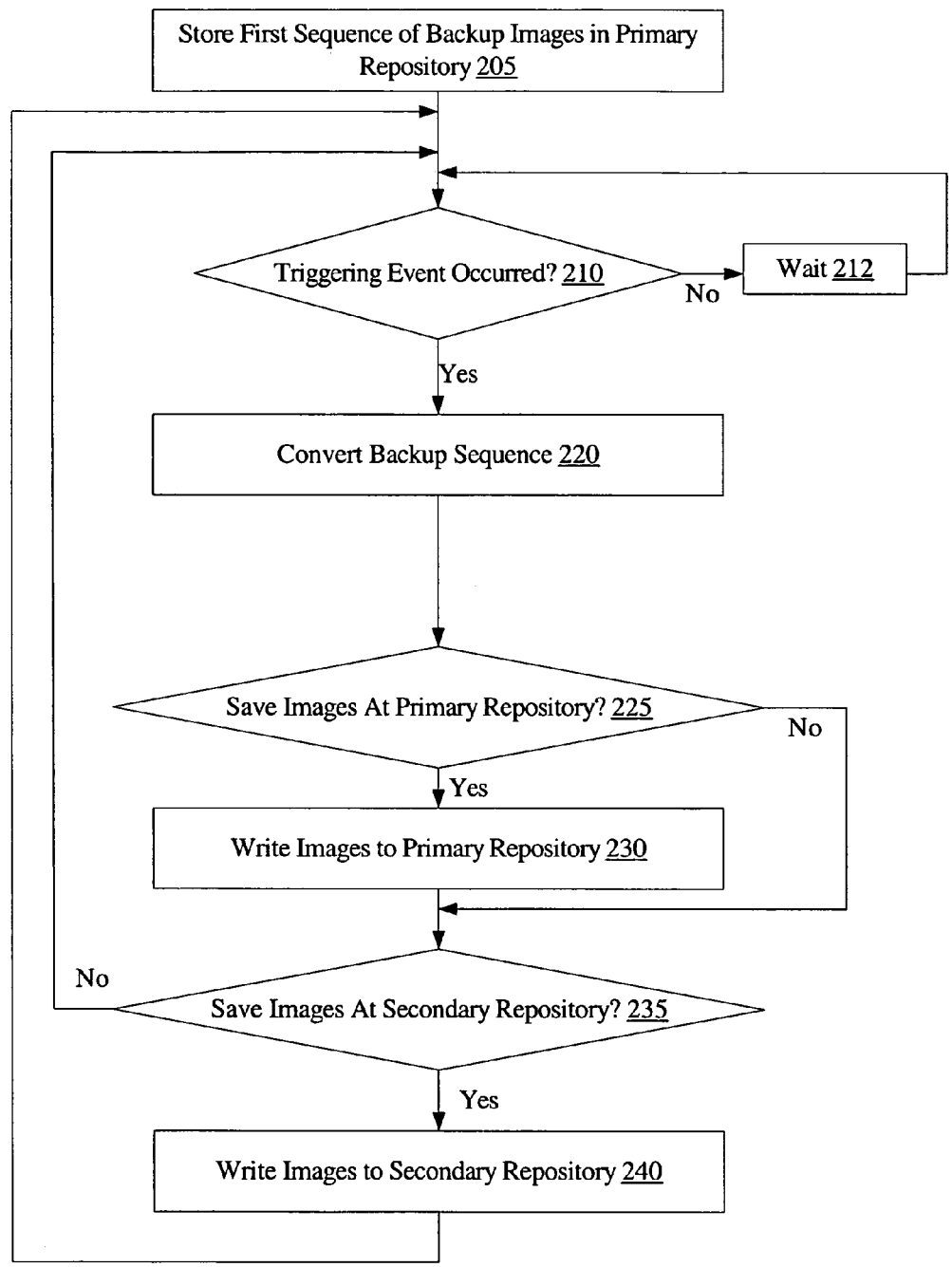
FIG. 2 is a flow diagram illustrating aspects of the operation of a system configured for backup sequence conversion according to one embodiment.

FIG. 2 is a flow diagram illustrating aspects of the operation of system 100 configured for backup sequence conversion according to one embodiment. Initially (block 205 of FIG. 2), backup images 120 of backup sequence 125 may be stored within primary backup repository 170, for example as described above using a backup schedule. Upon the occurrence of a triggering event 115 (block 210), backup converter 150 may be configured to convert backup sequence 125 into backup sequence 135 (block 220). If a triggering event is not detected, backup converter 150 may be configured to wait (block 212). Further details and examples of different types of triggering events 115, and the kinds of operations that may be performed during the conversion of backup sequence 125, are provided below. Backup converter 150 may then store a subset or all of the transformed backup sequence 135 within primary backup repository (blocks 225 and 230). In some embodiments, system 100 may include a secondary backup repository, and part or all of the transformed backup sequence 135 may be stored within the secondary backup repository (blocks 235 and 240). It is noted that in embodiments where backup images 130 are written to both primary and secondary backup repositories, backup images 130 may be written to the different repositories in any order: i.e., images may be written to primary backup repository 170 first, to a secondary backup repository first, or to both types of repositories in parallel.

Figure 3:
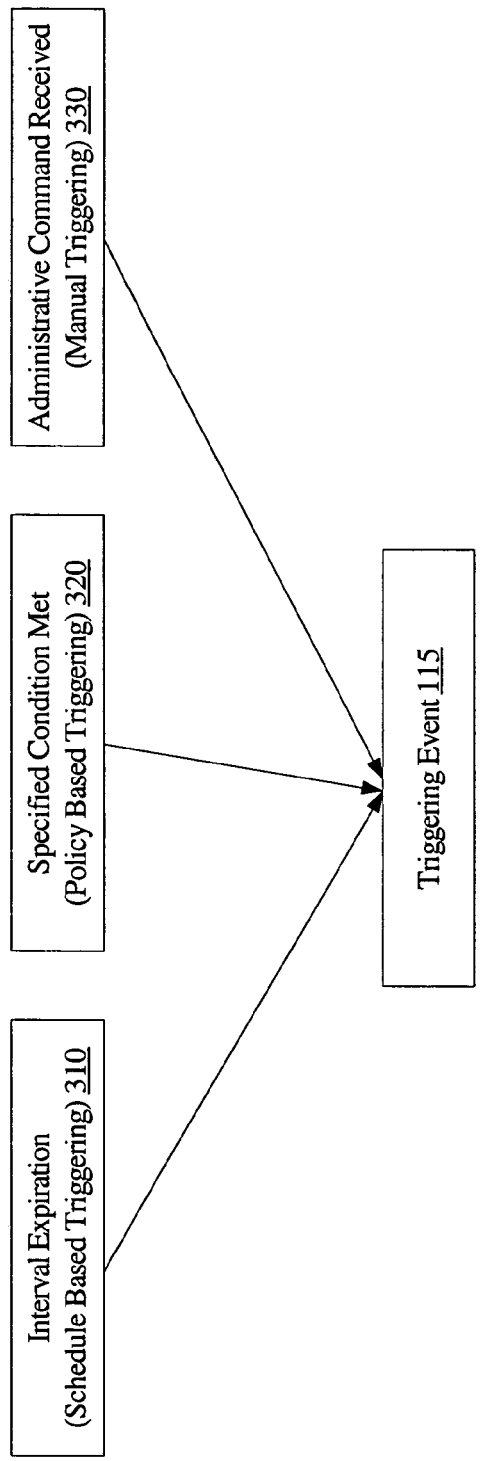
FIG. 3 is a block diagram illustrating three exemplary types of triggering events, according to one embodiment.

FIG. 3 is a block diagram illustrating three exemplary types of triggering events 115, according to one embodiment. As shown in block 310, a triggering event may be an expiration of an interval of time, i.e., triggering of backup sequence conversion may be based on a schedule. For example, a schedule similar to the following could be specified for backup image creation and backup sequence conversion in one embodiment:

1. Create a full backup on disk every night starting at 11:00 pm.
2. Every Sunday, starting at 1:00 am, convert the last six full backups for the week to incremental backups on disk.
3. On every fourth Monday, starting at 1:00 am, logically combine the incremental images for each week of the four preceding weeks into a single incremental image for the week, and migrate the backups for the four weeks from disk to secondary storage. Remove any backup sequences from disk that are more than a year old.

As illustrated in the above example, a schedule may be used to specify precise starting times at which backup converter 150 may initiate backup sequence conversions, as well as the specific image type transformations or logical combinations to be performed, and the target repositories or storage devices to be used. In some embodiments, a time range or window may be specified for each desired backup sequence conversion (e.g., "between 1:00 am and 7:00 am on each Monday") instead of a starting time. In such embodiments, if backup converter 150 is unable to complete the desired operation in the specified time range, backup converter 150 may be configured to write an error message to a log, display an error message on a screen or console, or otherwise inform a system administrator of the incomplete sequence conversion. In one implementation of schedule-based triggering, a mechanism such as an operating system timer may be used to send a signal to backup converter 150 when a scheduled backup conversion is to occur, while in another embodiment, backup converter 150 may be configured to poll periodically (e.g., once every five minutes) to check whether a scheduled backup sequence conversion should begin.

In some embodiments, instead of or in addition to using a precisely specified schedule, a backup sequence conversion policy may specify one or more conditions, and backup converter 150 may be configured to initiate backup sequence conversion when specified conditions are met (block 320 of FIG. 3). As used herein, a backup sequence conversion policy may include or specify an arbitrary set of one or more conditions, where a determination that any one or a combination of the conditions has been met may result in a triggering of a conversion of backup sequence 125. In some embodiments, the backup sequence conversion policy may specify conditions related to resource consumption. In one such embodiment, for example, a backup conversion may be automatically triggered upon a detection that the total amount of space being used by a backup sequence 125 has exceeded a specified threshold, or that the fraction of repository space being used for a particular type of backup image has reached a specified threshold (e.g., when full images take up 50% of the repository). In another embodiment, backup converter 150 may be triggered by a detection that the number of backup images of a particular backup type has reached a specified limit (e.g., conversion of differential images to incremental images may be triggered when ten differential images have been created within a backup sequence). In some embodiments, the utilization levels of one or more resources such as disks, tapes, processors, or networks, may be tracked, e.g., using one or more performance tools, and backup conversions may be triggered when the utilization for a specified resource or resources reaches a threshold. Such utilization-based backup conversion policies may be particularly useful when resources such as disks and/or tapes are shared between backup converter 150 and other applications, or between multiple instances of backup converter 150. For example, conversion of backup images at a primary backup repository 170 comprising disk storage may be triggered only when the average disk utilization (e.g., due to applications other than backup converter 150) remains within a threshold range of low utilization (such as 20%-30%) for a specified period. Such a detection of a sustained low utilization level for disks may indicate that the additional workload generated by backup conversion may be sustainable without affecting the performance of other applications that may share the disks. Similarly, migration or staging of backup images to a secondary storage repository comprising tape storage may be triggered when the average tape utilization remains within a threshold range for a specified period. A variety of other rules or conditions may be specified using a backup sequence conversion policy in different embodiments. A reception of an administrative command (block 330 of FIG. 3) (e.g., a command issued manually by a system administrator) may also trigger backup converter 150 to convert a backup sequence 125 in some embodiments. Any of the three types of triggering events illustrated in FIG. 3 (schedule-based, policy-based, or manual) may be used, in isolation or in combination with other types of triggering events, within a given embodiment.

Figure 4:
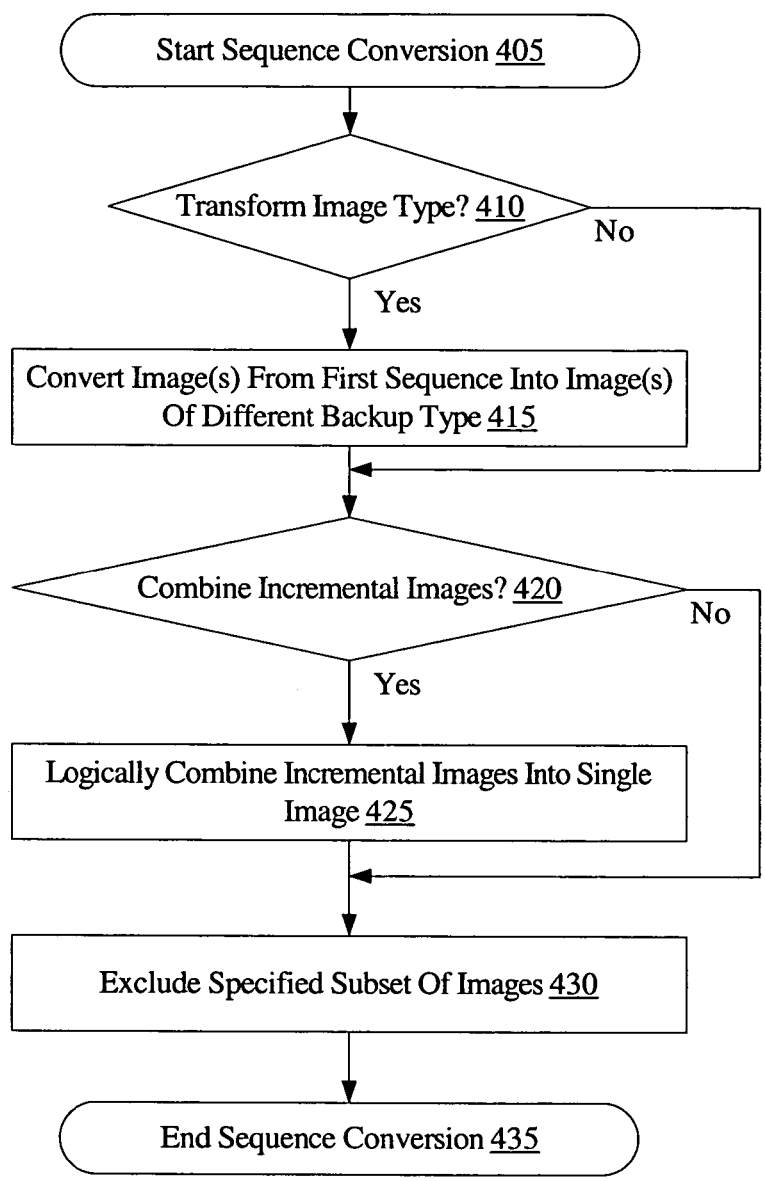
FIG. 4 is a flow diagram illustrating aspects of the operation of a backup converter during a conversion of a backup sequence according to one embodiment.

As described earlier, backup converter 150 may be configured to use any of a number of different techniques during a conversion of backup sequence 125 into backup sequence 135, triggered by any of the types of triggering events described above. FIG. 4 is a flow diagram illustrating aspects of the operation of backup converter 150 during a conversion of backup sequence 150 according to one embodiment. That is, the steps illustrated in FIG. 4 may correspond to the functionality described above for block 220 of FIG. 2, for one specific embodiment. In the illustrated embodiment, three types of operations may be performed during backup sequence conversion: image type transformations, logical combinations of images, and exclusion or a logical removal of images from the converted sequence. Upon starting the process of backup sequence conversion (block 405), backup converter may determine whether a specific image 120 of backup sequence 125 is to be transformed into a different type of backup image 130 (block 410), where the converted or transformed backup image 130 requires less storage space than its source backup image. Any such desired backup image type transformations may then be performed (block 415). If two or more incremental images within backup sequence 125 are to be logically combined into a single backup image (block 420), such logical combinations may then be performed (block 425). Finally, a specified subset of backup images 120 may be excluded from backup sequence 135 (block 430) prior to a completion of the image conversion process (block 435). It is noted that the three types of operations illustrated in FIG. 4 (i.e., backup image type transformations, logical combinations of two or more backup images, and exclusion of specified subsets of images) may be used in any combination in different embodiments, while in some embodiments only one of the three types of operations may be used. For example, in one embodiment, the conversion of a backup sequence image may consist entirely of deletion or exclusion of a subset of the original images, without any type transformations or logical combinations. It is also noted that in embodiments where more than one of the three types of operations illustrated in FIG. 4 is employed, the operations may be performed in any order (e.g., a logical combination of incremental images may be performed prior to a type transformation operation).

Figure 5A:
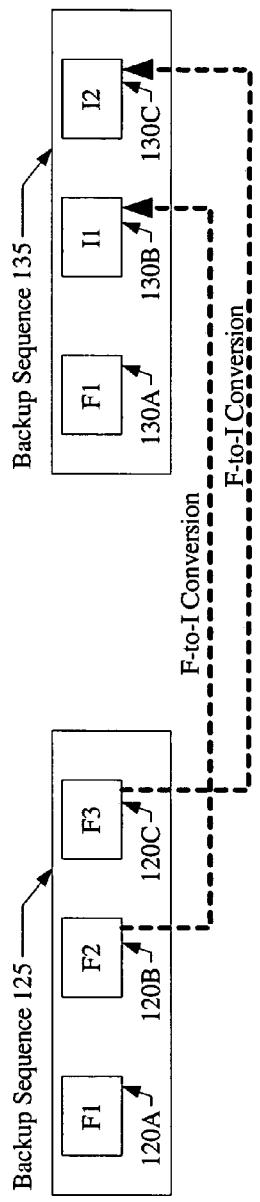
FIG. 5a, FIG. 5b, and FIG. 5c are block diagrams illustrating exemplary backup sequence conversions that may be performed by a backup converter according to one embodiment.
Figure 5B:
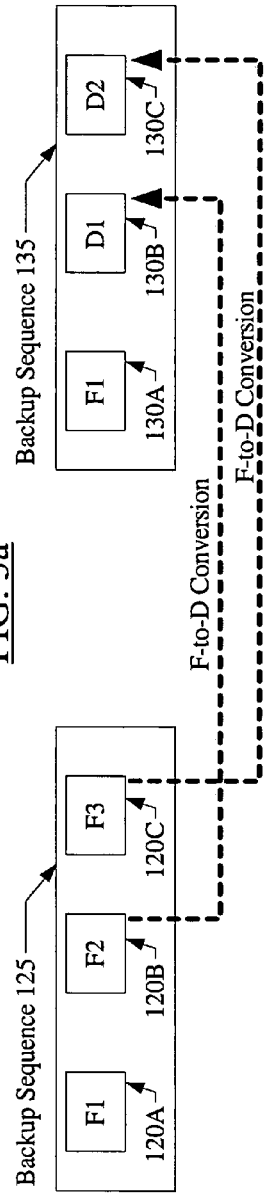
Figure 5C:
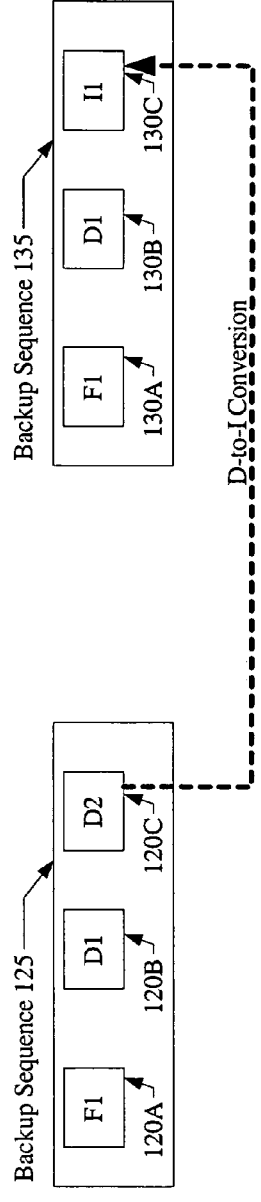

FIG. 5*a*, FIG. 5*b*, and FIG. 5*c* are block diagrams illustrating exemplary backup sequence conversions that may be performed by backup converter 150 during the step illustrated in block 415 of FIG. 4 according to one embodiment. In each of FIGS. 5*a*-5*c*, backup sequence 125 includes three backup images 120A-120C. In FIG. 5*a* and FIG. 5*b*, each backup image 120A-C is a full backup image, as indicated by the corresponding backup image name (F1 for backup image 120A, F2 for backup image 120B, and F3 for backup image 120C). In FIG. 5*c*, backup sequence 125 consists of a full backup image F1 followed by two differential images D1 and D2. Backup converter 150 may be configured to convert one or more images 120 of backup sequence 125 (e.g., F2 and F3 in the case of FIG. 5*a*) into corresponding images 130 of a different backup type.

In FIG. 5*a*, backup converter 150 converts full images F2 and F3 into incremental images I1 and I2, respectively. In FIG. 5*b*, full images F2 and F3 are converted into differential images D1 and D2, respectively, while in FIG. 5*c*, D3 is converted into incremental image I1. The three backup type conversions illustrated in FIGS. 5*a*-5*c* are, respectively, full image to incremental image (which may be referred to herein as an F-to-I conversion), full image to differential image (abbreviated as F-to-D) and differential image to incremental image (abbreviated as D-to-I). In each case, the transformed image may require less storage space than its corresponding source image. In some embodiments, once the transformed backup images have been saved, the original or source images may be discarded or removed, thereby reducing the total amount of storage required for backup images. In other embodiments, the original backup images may be overwritten in place by the transformed backup images.

It is noted that the backup type transformations described above may be utilized for backup sequences of any length (greater than one), and that more than one backup type conversion (from among F-to-I, F-to-D, and D-to-I conversions), may be applied within a single backup sequence transformation. For example, a backup sequence 125 including backup images (F1, D1, F2, D2, F3, D3), may be converted into a backup sequence 135 including backup images (F1, I1, I2, I3, D4, I4). That is, in such an example, backup converter 150 may convert full image F2 into incremental image I2 (an F-to-I conversion), full image F3 to differential image D4 (F-to-D), while differential images D1, D2 and D3 may be converted into incremental images I1, I3 and I4, respectively (which may represent D-to-I conversions).

During conversion of a backup sequence 125, backup converter 150 may need to perform several intermediate steps. In one embodiment, for example, backup converter 150 may be configured to select among several possible transformations. For example, a backup sequence 125 of three full images (F1, F2, F3) may be converted into any one of several transformed sequences, such as (F1, I1, I2), (F1, D1, D2), (F1, I1, D1), (F1, D1, I1), (F1, I1, F3), etc. Backup converter may use a variety of techniques to select the specific type transformations to apply. For example, in one embodiment, backup converter 150 may require a listing of specific desired transformations to be provided in advance, e.g., as part of a backup sequence conversion policy or as part of a backup conversion schedule. In another embodiment, backup converter may be configured to select among possible transformations based on different desired levels of space savings: e.g., if space saving is to be maximized, all possible full and differential images may be transformed. The desired level of space saving may be provided to backup converter 150 via a configuration parameter or some other suitable interface, and a default level may be used if a value is not specified via the interface. In other embodiments, backup converter 150 may be configured to use heuristics, e.g., rules based on measurements of space usage, to decide the specific transformations to be performed. Once the specific transformations are determined, backup converter 150 may perform one or more analysis steps, where, for example, the data differences between successive backup images of backup sequence 125 are computed (such as files that were modified, created or deleted between the creation times of the successive backup images). In some embodiments, backup converter 150 may focus on one backup image conversion at a time: e.g., during a conversion of a backup sequence (F1, F2, F3) to (F1, I1, I2) backup converter may first convert (F1, F2, F3) to (F1, I1, F3), and then, in a logically independent step, convert (F1, I1, F3) to (F1, I1, I2). In other embodiments, backup converter 150 may be configured to combine at least part of the analysis for multiple image transformations prior to completing any one transformation, or may be configured to perform multiple transformations in parallel.

In the embodiments illustrated in FIGS. 5a-5c, and FIG. 4, the total number of backup images may remain unchanged during the conversion of backup sequence 125 to backup sequence 135. That is, for every point of time at which a backup image was created for backup sequence 125, a corresponding backup image may exist in converted backup sequence 135, allowing the state of the data source to be restored to any of those points of time. In some embodiments, as described earlier and illustrated in block 420 of FIG. 4, it may be desired to logically combine two or more backup images 120 into a single backup image 130, thus reducing the total number of backup images during backup sequence conversion, while still retaining enough information to allow data source restoration as of some subset of desired backup creation times.

Figure 6A:
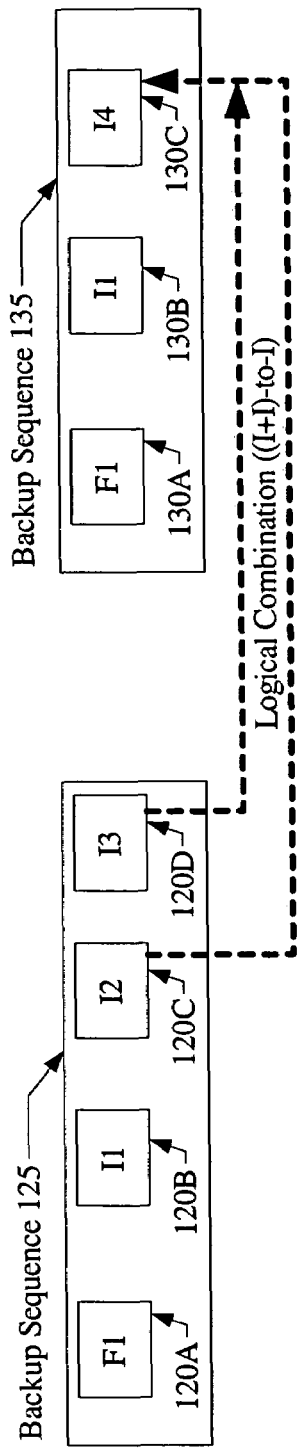
FIG. 6a and FIG. 6b are block diagrams illustrating two exemplary backup sequence conversions according to one embodiment, where a backup converter may be configured to logically combine two incremental images.
Figure 6B:
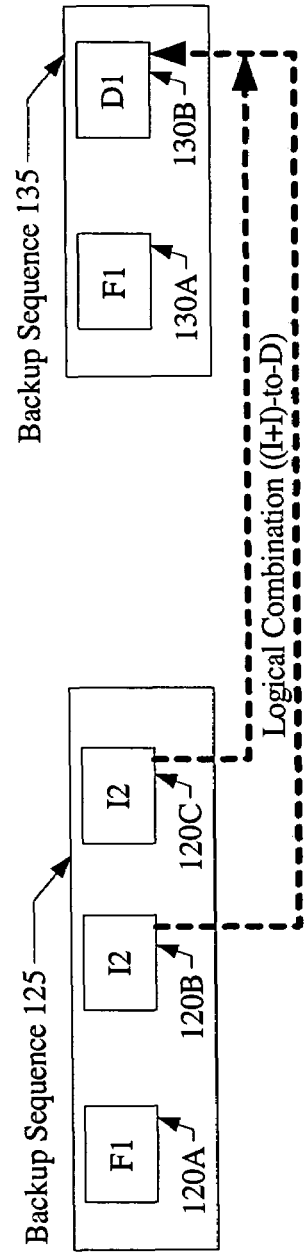

FIG. 6a and FIG. 6b are block diagrams illustrating two exemplary backup sequence conversions according to one such embodiment, where backup converter 150 may be configured to logically combine two incremental images (I1 and I2) of backup sequence 125 into a single backup image in backup sequence 135. In FIG. 6a, incremental images I1 and I2 are logically combined into a single incremental image I4 (which may be termed an (I+I)-to-I combination), while in FIG. 6b, incremental images I1 and I2 are logically combined into a single differential image D1 (which may be termed an (I+I)-to-D combination). When performing a logical combination of two consecutive incremental images I1 and I2, the changes incorporated within each incremental image may be reflected in the combined image I4 or D1, so that the state of the data source as of the time that I2 was created may be restored if needed. However, in one embodiment, any changes incorporated within I1 (such as a creation of a particular file "fileA") that are reversed or undone between the creation of I1 and I2 (e.g., a deletion of the file "fileA") may not be reflected in the combined image I4 or D2.

Figure 7:
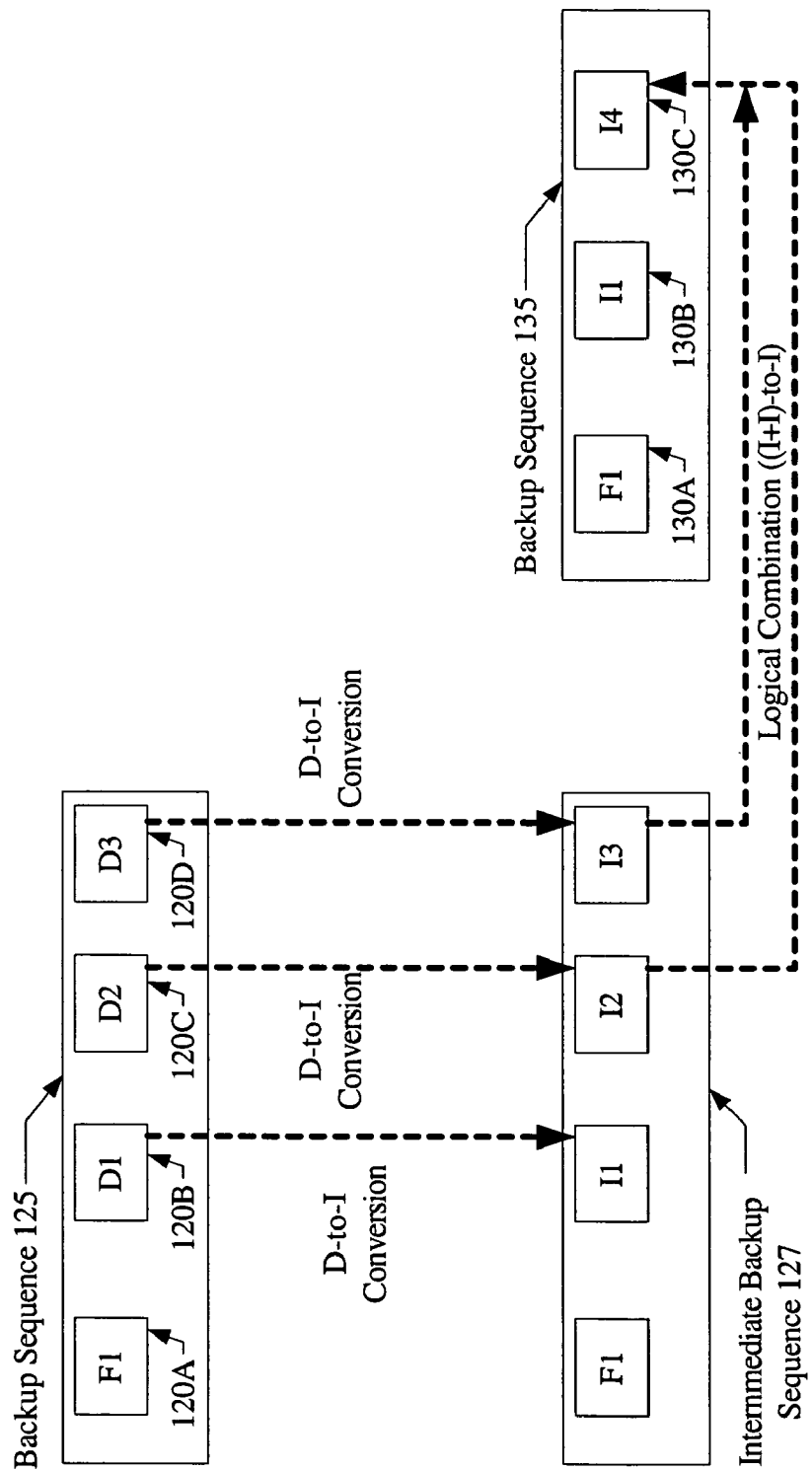
FIG. 7 is a block diagram illustrating an exemplary two-step backup sequence conversion according to one embodiment.

As described earlier, backup converter 150 may be configured to apply any or all of the backup image type transformations depicted in FIGS. 5a-5c and the logical combination techniques depicted in FIGS. 6a-6b, to a single given backup sequence 125. FIG. 7 is a block diagram illustrating an exemplary two-step backup sequence conversion according to one embodiment, where D-to-I backup type transformations are performed during a first step resulting in intermediate backup sequence 127, and a logical combination ((I+I)-to-I) is performed during a second step. In some embodiments, image type transformations and logical combinations may be performed during a single step rather than in two separate steps as depicted in FIG. 7.

Figure 8:
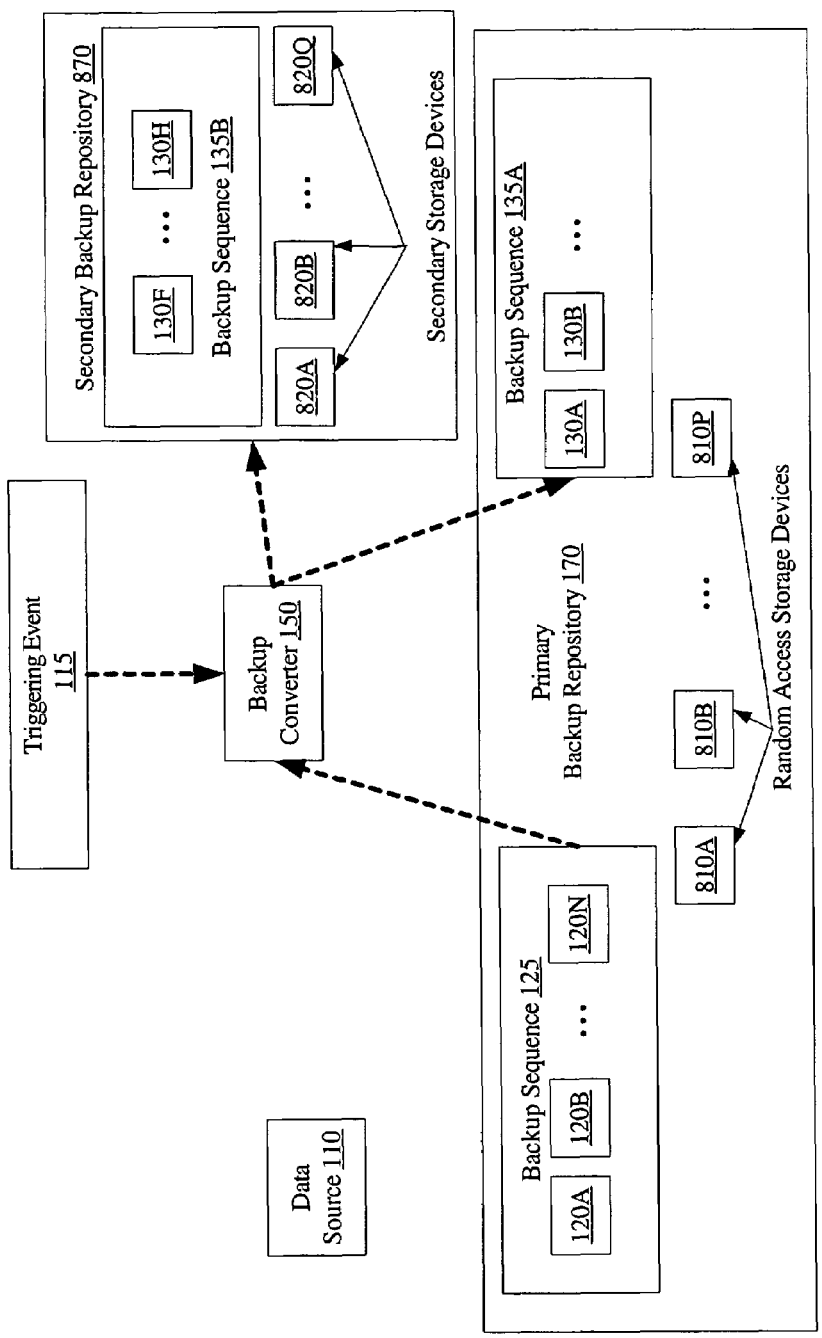
FIG. 8 is a block diagram illustrating a primary backup repository including random access storage devices, and a secondary storage repository including secondary storage devices according to one embodiment.

As described earlier in conjunction with the description of FIG. 2, some or all of backup images 130 of transformed backup sequence 135 may be stored in a secondary backup repository in some embodiments. FIG. 8 is a block diagram illustrating a primary backup repository 810 including random access storage devices 810A . . . 810P (collectively, storage devices 810), and a secondary storage repository 870 including secondary storage devices 820A . . . 820Q (collectively, storage devices 820) according to one embodiment. In the illustrated embodiment, a subset 130F . . . 130H of transformed backup sequence 135 (identified as backup sequence 135B in FIG. 8) may be stored within secondary backup repository 870, while the remaining backup images 130 (identified as backup sequence 135A) may be stored within primary backup repository 170. In other embodiments, the entire transformed backup sequence 135 may be stored at either primary backup repository 170 or secondary backup repository 870. For example, transformed backup sequence 135 may be migrated to secondary backup repository 870 during a staging operation for archival or long-term storage. It is noted that any designated subset of backup images 130 may be stored within secondary backup repository 870, e.g., every second full image from backup sequence 125 may be written to secondary backup repository 870. Thus, the set of backup images stored within secondary backup repository may not all correspond to a specific consecutive sub-sequence of backup sequence 125.

Storage devices 810 may include any of a variety of random access devices such as disks, disk arrays, intelligent disk arrays, CD-RW devices, DVD-RW devices, and the like, which may be hosted at a single host, distributed across multiple hosts or storage servers, and/or accessible via a network such as a storage area network. Secondary storage devices 820 may include various kinds of tape devices (e.g., 8 mm tape devices, Digital Linear Tape (DLT™) devices, Advanced Intelligent Tape (AIT™) devices, Linear Tape Open (LTO) devices, etc.), as well as other types of media suitable for archival, such as CD-ROMs, DVD-ROMs, etc. In some embodiments, primary backup repository 170 may also include sequential access storage devices such as tapes, and secondary backup repository 870 may also include random access storage devices such as disks. Any appropriate storage protocol, such as various variants of SCSI (Small Computer System Interface), Fibre Channel, etc., may be used to access storage devices 190, as desired. In some embodiments the converted or transformed backup sequence 135 may be saved in a different location from the location used for original backup sequence 125, i.e., without overwriting any part of original backup sequence 125. In such embodiments, after backup sequence 135 is saved or written to storage devices 190, part or all of backup sequence 125 may be discarded, thus allowing a re-use of storage space. In other embodiments, part or all of original backup sequence 125 may be overwritten by transformed backup sequence 135.

In another embodiment, multiple levels of backup repositories may be used: e.g., a primary backup repository for a week's collection of backup images, a secondary backup repository for a month's collection of backup images, and a tertiary backup repository for storing backup images older than a month. In such embodiments, the backup sequence conversion techniques described above may be used during transfers of backup images from any level of backup repository to another. Both the time taken to stage backup images to a different level of repository, and the space occupied by the staged backup images, may be reduced using backup conversion. In different embodiments, the storage devices of a given repository layer may be distributed across multiple hosts, may be accessible via storage area networks or some other network, or may be managed at a single computer host.

It is noted that data source 110 may include a variety of different storage objects in different embodiments. For example, in one embodiment data source 110 may include the files of one or more file systems. The file systems may include distributed file systems and/or single-host file systems from one or more hosts. In another embodiment, data source 110 may be a collection of one or more block virtual devices such as logical volumes (e.g., backup images 120 may be created at the block or volume level rather than at a file level), or may include other types of logical storage objects such as pointers to files or volume partitions. In some embodiments the data to be backed up may be compressed during backup sequence conversion, to further reduce storage space requirements.

Backup converter 150 may be any device or software module that may be capable of providing the functionality described above. For example, in one embodiment, backup converter 150 may be incorporated as a layer or component within a backup management software program, while in another embodiment, backup converter 150 may be a stand-alone program. In one embodiment, backup converter 150 may be incorporated within a computer host, such as a server computer that includes one or more processors and one or more system memories. In one specific implementation, backup converter 150 and part or all of a data source 110 (such as a file system) may be co-located at the same host or server, while in other implementations, backup converter 150 may be hosted at one or more storage servers managing a backup repository, or at a server dedicated for backup purposes.

Figure 9:
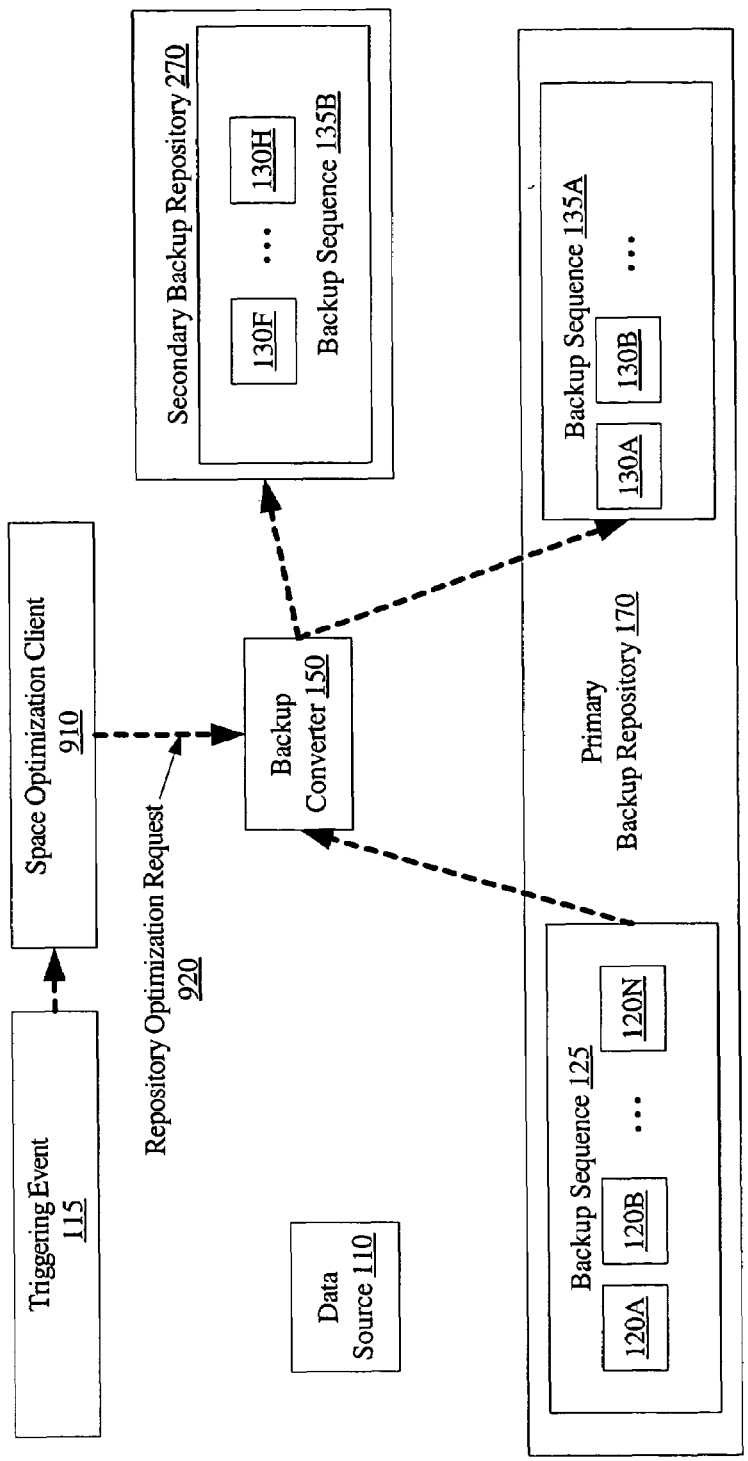
FIG. 9 is a block diagram illustrating one embodiment including a space optimization client configured to send a repository optimization request to a backup converter upon the occurrence of a triggering event.

The backup sequence transformation functionality described above may also be implemented cooperatively using a plurality of computer hosts in some embodiments. FIG. 9 is a block diagram illustrating one embodiment including a space optimization client 910 configured to send a repository optimization request 920 to backup converter 150 upon the occurrence of a triggering event. Space optimization client 910 may comprise, for example, a user interface (which may be used, for example, to provide manual input selecting the specific backup image transformations desired from a number of possible transformations) at a client computer host, or a set of resource consumption monitors that may be incorporated at one or more computer hosts. Repository optimization request 920 may be sent to backup converter 150 using any suitable communication protocol such as TCP/IP. In response to the repository optimization request 920, backup converter 150 may be configured perform the backup image transformations as described above. In one embodiment, backup converter 150 may also be configured for high availability (e.g., clustered for failover) using multiple computer hosts. It is noted that space optimization client 910 may also be incorporated within the same host as backup converter 150 (e.g., as a separate software component or layer) in some embodiments.

Figure 10:
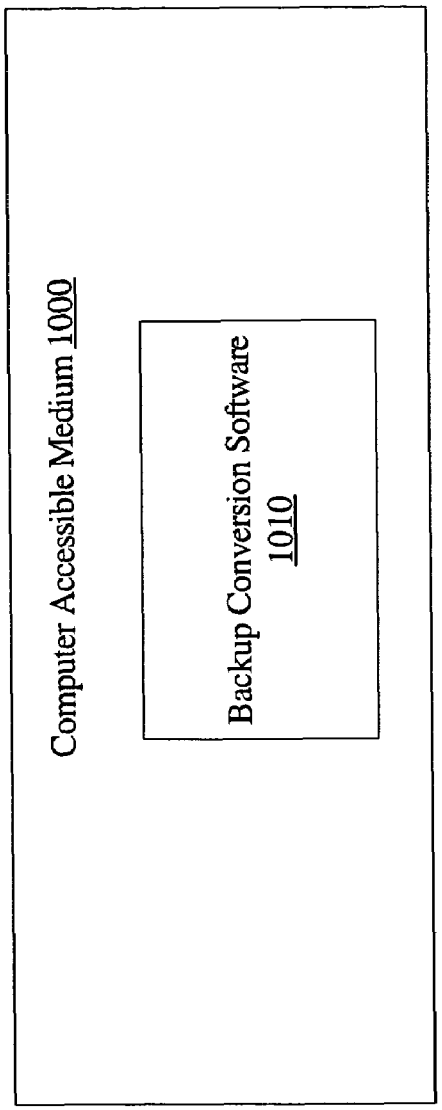
FIG. 10 is a block diagram of one embodiment of a computer accessible medium.

FIG. 10 is a block diagram of one embodiment of a computer accessible medium 1000, comprising backup conversion software instructions 1010 executable to perform the functionality of backup converter 150 and space optimization client 910 as described above. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a backup repository configured to store a first sequence of backup images of a data source, wherein the first sequence includes a first full backup image representing a state of the data source at a first time T1, a second full backup image representing the state of the data source at a second time T2, and a third full backup image representing the state of the data source at a third time T3; and
   a backup converter;
   wherein, upon an occurrence of a triggering event, the backup converter is configured to convert the first sequence of backup images into a second sequence of backup images by transforming the second full backup image into a first differential image, by transforming the third full backup image into a second differential image, and by causing the second sequence of backup images to be stored within the backup repository, wherein the second sequence includes the first full backup image representing the state of the data source at the time T1, the first differential image representing the state of the data source at the time T2, and the second differential image representing the state of the data source at the time T3.

2. The system as recited in claim 1, wherein the triggering event is an expiration of an interval of time specified in a schedule.

3. The system as recited in claim 1, wherein the triggering event is a reception of an administrative command.

4. The system as recited in claim 1, wherein the triggering event is specified in a backup sequence conversion policy.

5. The system as recited in claim 1, wherein the triggering event is a detection that an amount of storage used in the first sequence for backup images of one or more specified backup types has reached a specified threshold.

6. The system as recited in claim 1, wherein the triggering event is a detection that a number of backup images of a specified backup type within the first sequence has reached a specified threshold.

7. The system as recited in claim 1, wherein the triggering event is a detection that a utilization of a storage resource has reached a specified threshold.

8. The system as recited in claim 1, wherein the backup repository comprises one or more random-access storage devices.

9. The system as recited in claim 1, wherein the backup repository includes a primary backup repository that stores the first sequence of backup images and a secondary backup repository into which the backup converter causes the second sequence of backup images to be stored.

10. A system comprising:
a backup repository configured to store a first sequence of backup images of a data source, wherein the first sequence includes a first full backup image representing a state of the data source at a first time T1, a second full backup image representing the state of the data source at a second time T2, and a third full backup image representing the state of the data source at a third time T3;
a space optimization client; and
a backup converter;
wherein the space optimization client is configured to send a repository optimization request to the backup converter upon an occurrence of a triggering event; and
wherein the backup converter is configured to:
convert the first sequence of backup images into a second sequence of backup images in response to the repository optimization request by transforming the second full backup image of the first sequence into a first differential image, by transforming the third full backup image into a second differential image, and by causing the second sequence of backup images to be stored within the backup repository, wherein the second sequence includes the first full backup image representing the state of the data source at the time T1, the first differential image representing the state of the data source at the time T2, and the second differential image representing the state of the data source at the time T3.

11. A method comprising:
storing a first sequence of backup images of a data source within a backup repository, wherein the first sequence includes a first full backup image representing a state of the data source at a first time T1, a second full backup image representing the state of the data source at a second time T2, and a third full backup image representing the state of the data source at a third time T3;
detecting an occurrence of a triggering event; and
in response to the detection of the occurrence of the triggering event, converting the first sequence of backup images into a second sequence of backup images by transforming the second full backup image of the first sequence into a first differential image, by transforming the third full backup image into a second differential image, and by causing the second sequence of backup images to be stored within the backup repository, wherein the second sequence includes the first full backup image representing the state of the data source at the time T1, the first differential image representing the state of the data source at the time T2, and the second differential image representing the state of the data source at the time T3.

12. The method as recited in claim 11, wherein the triggering event is an expiration of an interval of time specified in a schedule.

13. The method as recited in claim 11, wherein the triggering event is specified in a backup sequence conversion policy.

14. A computer-accessible storage medium comprising program instructions, wherein the program instructions are executable to:
store a first sequence of backup images of a data source within a backup repository, wherein the first sequence includes a first full backup image representing a state of the data source at a first time T1, a second full backup image representing the state of the data source at a second time T2, and a third full backup image representing the state of the data source at a third time T3;
detect an occurrence of a triggering event; and
in response to the detection of the occurrence of the triggering event, convert the first sequence of backup images into a second sequence of backup images by transforming the second full backup image into a first differential image, by transforming the third full backup image into a second differential image, and by causing the second sequence of backup images to be stored within the backup repository, wherein the second sequence includes the first full backup image representing the state of the data source at the time T1, the first differential image representing the state of the data source at the time T2, and the second differential image representing the state of the data source at the time T3.

15. The computer-accessible storage medium as recited in claim 14, wherein the triggering event is an expiration of an interval of time specified in a schedule.

16. The computer-accessible storage medium as recited in claim 14, wherein the triggering event is specified in a backup sequence conversion policy.

* * * * *